Nov. 25, 1924.  
H. ROWNTREE  
1,516,502  
HEEL AND TOE CONTROL OF VEHICLES  
Filed March 25, 1922   6 Sheets-Sheet 3

INVENTOR  
Harold Rowntree  
BY his ATTORNEYS Darby & Darby

Nov. 25, 1924.  1,516,502
H. ROWNTREE
HEEL AND TOE CONTROL OF VEHICLES
Filed March 25, 1922  6 Sheets—Sheet 4

INVENTOR
Harold Rowntree
BY his ATTORNEYS Darby & Darby

Nov. 25, 1924.
H. ROWNTREE
1,516,502
HEEL AND TOE CONTROL OF VEHICLES
Filed March 25, 1922
6 Sheets-Sheet 6

INVENTOR
Harold Rowntree
BY his ATTORNEYS Darby & Darby

Patented Nov. 25, 1924.

1,516,502

UNITED STATES PATENT OFFICE.

HAROLD ROWNTREE, OF NEW YORK, N. Y., ASSIGNOR TO NATIONAL PNEUMATIC COMPANY, OF NEW YORK, N. Y., A CORPORATION OF WEST VIRGINIA.

HEEL AND TOE CONTROL OF VEHICLES.

Application filed March 25, 1922. Serial No. 546,845.

*To all whom it may concern:*

Be it known that I, HAROLD ROWNTREE, a citizen of the United States, residing at New York, county of New York, State of New York, have made a certain new and useful Invention in Heel and Toe Control of Vehicles, of which the following is a specification.

This invention relates to control mechanism for controlling the operating parts of vehicles, for example, motor buses, street cars, and the like, wherein the control is effected by the foot of the operator, and further, wherein selectivity is effected as to the parts to be controlled.

The object of the invention is to provide a control of the character set forth which is simple in structure, efficient in operation, and economical of manufacture, installation, and maintenance.

A further object of the invention is to provide safety features in connection with the heel and toe control of my invention, which at all times safeguards the safety of the passengers in the event of accident to the motorman or the one operating the control.

Further objects of the invention will appear more fully hereinafter.

The invention consists substantially in the construction, combination, location, and relative arrangement of parts, all as will be more fully hereinafter set forth, as shown by the accompanying drawings, and finally pointed out in the appended claims.

Referring to the drawings:—

The same part is designated by the same reference character wherever it occurs throughout the several views.

The mechanism for controlling the operation of street cars has been a gradual development of many years. Refinement after refinement has been added to meet new operating conditions. Prior to the so-called one man car conception, the hands of the motorman were employed in managing the brake and the car controller, while such auxiliary features as the door control, the bell, the sander, the dropping of the fender, etc., were usually controlled by the foot. With the one man car conception, i. e., a single man is stationed on each car, to the proper manipulation of all the foregoing devices is added the collection of fares, and therefore the old arrangement whereby certain duties were performed by the hands of the operator or motorman, and other duties by the feet of the motorman, no longer is adequate to properly meet the situation. A realignment and new relation of the control mechanism to each other and to the motorman is consequently necessitated. If the time when each of these duties has to be performed is taken into consideration, together with the obvious fact that the fares must be collected by hand, it is possible to make the most efficient division of the duties as between the hands and the feet. The fares are always collected after the car has stopped, and either entirely before it starts, or in the period immediately after it has started. Obviously, therefore, the starting of the car and the closing of the door should most efficiently be by foot action, to enable the hands to be engaged at the time in completing the collection of fares. In accordance with my invention, I therefore propose to control the starting and also the stopping of the car by foot action, and in addition thereto, the control of the door motor where power devices are employed for door operation, to thereby enable the hands of the motorman to be free while the car is running for the operation of the exceptional devices that sometimes have to be quickly put into action while the car is under headway, such as dropping the fender, ringing the bell, sanding the track, etc., in addition to the added burden of collecting fares either before, during, or immediately after the car has been stopped. It is therefore among the special purposes of my present invention to provide a foot control which has been designed with regard to both safety and the most efficient operation of the various devices to be operated and duties to be performed by the motorman. The system of my invention, as will be more fully hereinafter pointed out, enables a control which is capable of all of the following conditions,—

1. The motorman can close the door without starting the car, but cannot start the car without closing the door.
2. The motorman can stop the car without opening the door, but cannot open the door without stopping the car.
3. The motorman can cut off the power without putting on the brakes, but cannot put on the brakes without cutting off the power.
4. The motorman can have his foot on the foot levers without either releasing the brakes or applying the power, but he cannot take his foot off of the foot levers without applying the emergency brakes and cutting off the power.

In addition to the foregoing the motorman has selectivity in the following respects,—

1. He can open the door if the car has stopped.
2. He can close the door without starting the car or close the door and start the car simultaneously.
3. He can operate the car, i. e., control its progress either forward or backward.
4. He can coast, i. e., can travel without power being applied.
5. He can bring the car to a stop without opening the door, and thereafter open the door, or he can make an emergency stop and open the door simultaneously.

As above stated, it is among the special purposes of my present invention to supply a foot control apparatus which will enable the foregoing operations.

While a control handle that is placed so that it can be easily seen can be readily moved by hand to several intermediate positions, each position accomplishing certain definite results, yet the human foot is not as susceptible to as accurate movement as the hand, and a foot operated lever that requires accurate spacing in intermediate positions involves a human sense of touch too fine to render the same safe in operation. I therefore employ, in accordance with my invention, an exceedingly simple arrangement whereby several different definite results can be obtained by foot action and yet no intermediate position of the foot is required, and I secure the foregoing results and control by separating the heel and toe of a foot control lever to enable them to be operated independently of the other, so that when the whole foot is pressed downward, one position is obtained; when the heel is pressed downward, another position; when the toe is down but the heel is raised, a third position; and when the foot is removed entirely a fourth position. By means of this arrangement I am enabled to obtain four separate and distinct positions from one foot.

Figure 1:
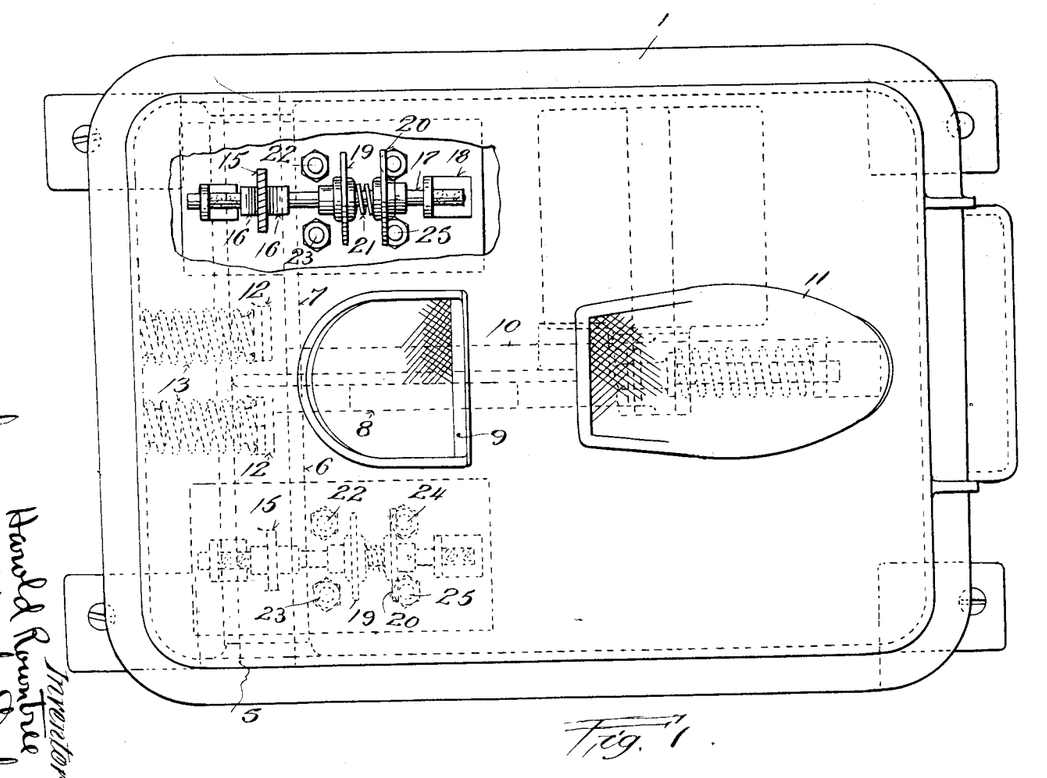
Fig. 1 is a top plan view of a heel and toe control box employed in accordance with my invention, partly broken away to show the interior construction.
Figures 2, 3, 4:
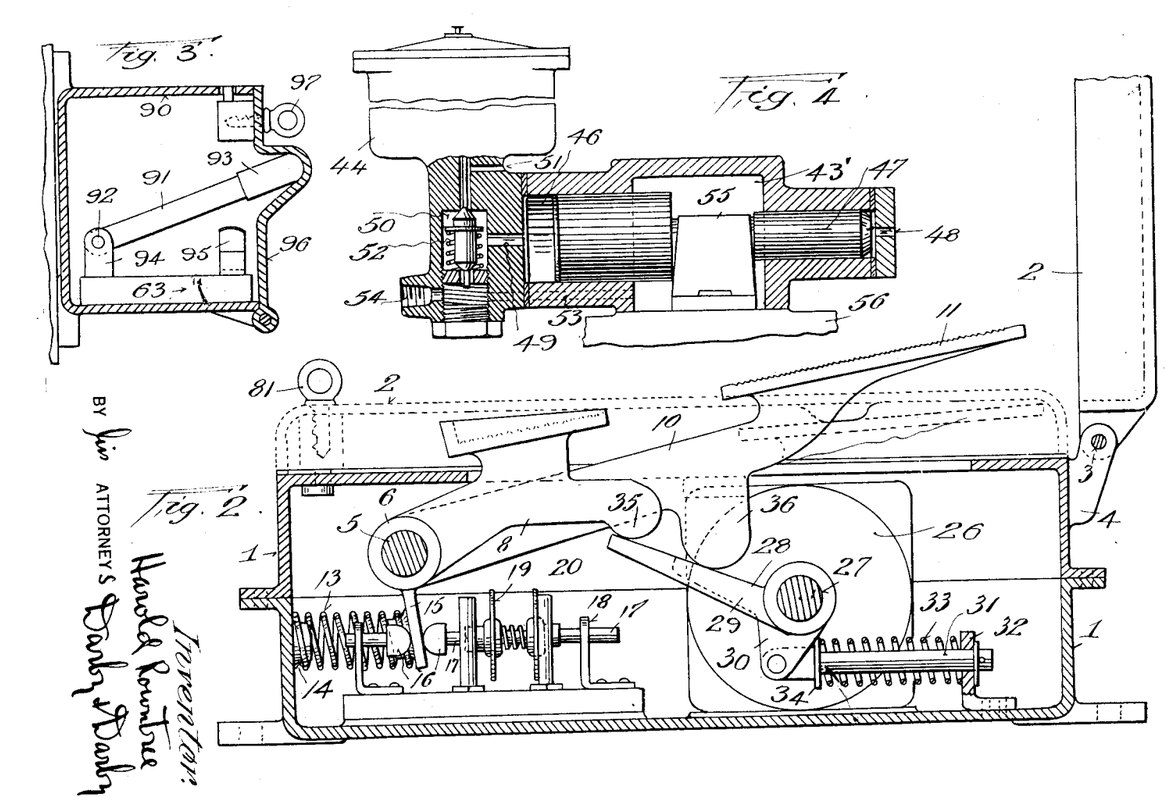
Fig. 2 is a vertical longitudinal sectional view of the same.
Fig. 3 is a similar view of a switch employed in accordance with my invention.
Fig. 4 is a view partially in section of a valve employed in accordance with my invention.

In accordance with my invention I employ what I will term the controller box 1, which has a cover 2 hinged thereto, preferably at the front end thereof, by means of a hinge 3 carried by a lug 4 formed on a portion of the box 1. Mounted within the box 1, and extending transversely thereacross is a shaft 5. The shaft 5 is provided with two sleeves 6 and 7, the sleeve 6 being secured by means of an arm 8 to the heel pedal 9, and the sleeve 7 being secured by means of an arm 10 to the toe pedal 11. By means of this construction it will readily be apparent that when the heel pedal 9 is depressed sleeve 6 is rotated, and, likewise, when the toe pedal 11 is depressed sleeve 7 will be rotated. Each of the sleeves 6 and 7 have a downwardly extending lug or finger 12 against which one end of springs 13 bear. The other end of the springs is anchored to a suitable lug 14 formed on the interior of the box 1. The purpose of these springs is to normally tend to retain the heel and toe pedals in their upward position, or, in other words, to exert a yielding tension to both the heel and toe pedals which will cause both to be raised in the event pressure is lifted therefrom. Each of the sleeves 6 and 7 also has secured thereto a depending arm or finger 15 positioned between buffers or rounded heads 16. One of each of heads 16 is carried by a shaft 17 which is movable in suitable guide lugs 18, and on which is mounted contactors 19 and 20 respectively. The bridging contactors 19 and 20 are provided with a spring 21 extending therebetween whereby both bridging contactors will move in unison until one or the other of them establishes circuit connection between the terminals with which they cooperate, and thereafter a limited movement is provided for the contactors relative to each other through the spring tension to prevent injury thereto in case excessive pressure is exerted on the pedal which controls the operation thereof. Contactor 19 of the toe pedal is adapted to establish communication between terminals 22 and 23 when the toe pedal is depressed, and contactor 20 of the toe pedal in that position breaks circuit connection between terminals 24 and 25. When, however, the toe pedal is raised circuit connection is established by its contactor 20 between terminals 24 and 25. Similarly the heel pedal 9 controls its contactors 19 and 20, and in similar manner its terminals 22, 23, and 24, 25. As will be more fully hereinafter described the circuits controlled in the manner above outlined through the control of the various terminals 22, 23, 24, and 25, control the car operation and its safety appliances. I will now describe the apparatus employed for the control of the brakes from this position. Brake controllers are of course well known, and all that will be necessary to show or describe to enable a complete understanding of the invention is to show the control effected of the brake controller shaft. In Figs. 1 and 2 the air brake controller is diagrammatically illustrated at 26, and is provided with its usual air brake controller shaft 27. Secured to this shaft is a bell crank lever 28 with the usual arms 29 and 30. The arm 30 is pivotally connected to a plunger 31 mounted in a lug guide 32 carried by the box 1, and which rod 31 is provided with a spring 33 bearing at one end against stationary lug 32, and at the other end against a collar 34 secured to the rod 31. With this arrangement it will be apparent that the arm 29 of the bell crank is normally retained in its upward position, and in the event pressure is imposed upon the arm 29, and thereafter the pressure is removed, the arm will be projected by means of the arrangement just described to its limit of movement. The heel pedal lever 8 is provided with an enlarged end 35 which is adapted to bear upon the approximate end of the arm 29 of the bell crank. The toe lever 11 is likewise provided with an enlarged downwardly projection or head 36, which also bears upon the arm 29 of the bell crank. In the normal position, that is, with both heel and toe levers in their upward position with no pressure thereon, both of the heads 35 or 36 bear lightly upon the arm 29. With this arrangement it will readily be apparent that either the heel or the toe pedal when depressed will cause movement of the arm 29. The heel pedal, however, bearing on the end of the arm 29 is limited in the movement it will impart to the arm. The toe pedal bearing on the arm at a point nearer its axis of rotation will cause a relatively greater movement of the arm 29. In accordance with by invention the arm 29 is made to assume one of three positions, in accordance with whether the heel or the toe is depressed.

In the position shown in Fig. 2, where neither the heel nor the toe ever is depressed, the arm is in the position corresponding to emergency brake applied position. If the heel alone were depressed, i. e., the arm 29 was rocked around its axis the maximum movement that could be imparted thereto by the heel lever alone, the arm would assume the position corresponding to the normal brake-on position. If the toe pedal was depressed the arm 29 would be rocked to a still further position, or brake-off position.

Figure 5:
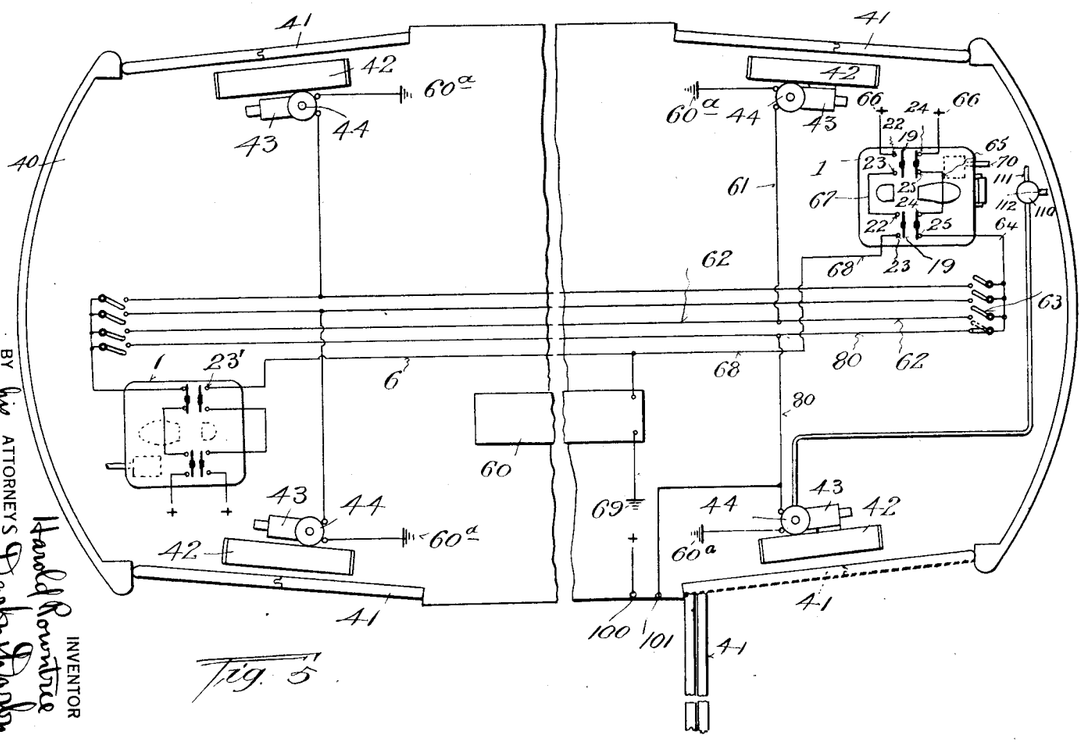
Fig. 5 is a diagrammatic view of the electric wiring of a street car equipped with the heel and toe control of my invention.
Figure 6:
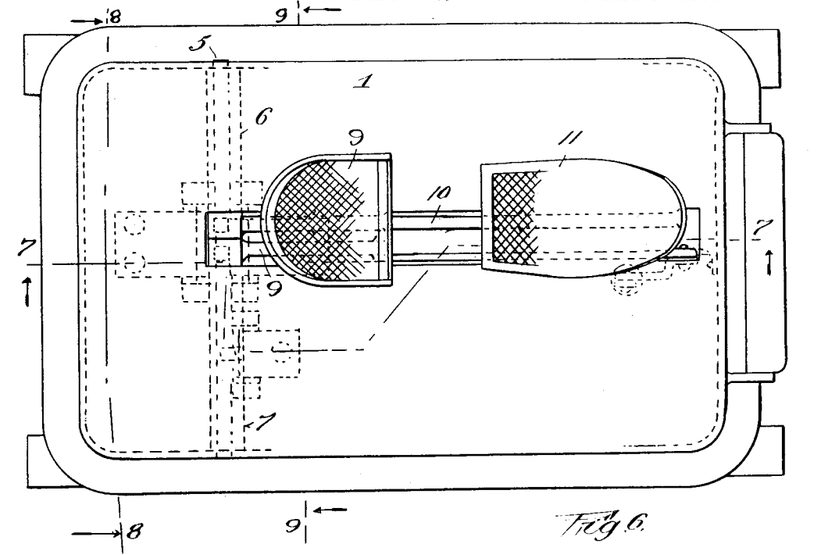
Fig. 6 is a top plan view of a modified control box designed for use in connection with motor buses.

I will now describe a practical application of the heel and toe controller to, first, a street car, as shown diagrammatically in Fig. 5. In this diagram 40 generally designates a car, such as a street car, having doors 41, for example, of the folding type, to which, however, I do not desire to be limited or restricted, controlled by pneumatic motors 42, the supply of fluid pressure to and the exhaust thereof from, being controlled by valves 43, which in turn is electrically controlled through magnet valves 44. A type of valve for this purpose is illustrated in Fig. 4, wherein the valve 43 consists of a differential air-chest, i. e., differential pistons 46 and 47. Piston 47 operates in a cylinder which is at all times open to exhaust through passage 48, and piston 46 operates in a cylinder which communicates through passage 49 with the chamber 50 controlled by magnet valve 44. The valve 44 is of the usual magnet type, and has a passage 51 to exhaust. The valve 52 thereof is adapted in one position to open communication from the cylinder of larger diameter through passage 49 and exhaust passage 51 to atmosphere, at the same time closing communication from the air chest 43′, passage 53, and passage 49. In the other position of the valve, the exhaust port 51 is closed, and communication of air pressure is established from the air chest 43, through passage 53, passage 49, behind the cylinder of larger diameter. If desired, a connection 54 may be supplied for the supply of pressure, instead of passage 53, when an independent control of the door is desired, and will be hereafter explained. Positioned between pistons 46 and 47 to be moved thereby is a slide valve 55, which is secured to a valve block 56, which controls the door motor in the usual well known manner. The car is equipped with the usual automatic car controller 60 of the type well understood and at present in use, which is sometimes also referred to as the automatic accelerator, i. e., power is turned on to full position, but the car starts gradually and the acceleration is automatically gradually effected. Positioned on the car, and preferably at the end thereof, i. e., the motorman's station, is the heel and toe control box 1. If the car is to be used for travel in both directions then a heel and toe control box is positioned at both ends of the car, as shown, and as will be described. The various parts of the heel and toe control mechanism are reproduced diagrammatically, but the equipment is shown with the emergency brake on and the door open, and power cut off, i. e., the position incident to pressure being entirely lifted from both heel and toe pedals. The diagram also shows the car in operation towards the right, i. e., the cover of the heel and toe box at the right end is off, whereas the same is on in locked position, as will be more fully hereinafter explained, at the left end.

I will now describe the various circuits employed with this equipment. One terminal of each of the magnet valves 44 is grounded as at 60ª. The front left hand magnet valve 44 has its other terminal connected through wire 61 to wire 62, which is controlled by switch 63, which switch, when closed, establishes circuit connection through wire 64 to heel controlled terminal 25. Heel controlled terminal 24 and toe controlled terminal 25 are connected together through wire 65. Toe controlled terminals 22 and 24 are connected to a source of current as indicated at 66. Toe controlled terminal 23 and heel controlled terminal 22 are connected together by wire 67, and toe controlled terminal 23 is connected by wire 68 to the automatic car controller 60, which is grounded as at 69. It is also connected by wire 6 to heel controlled terminal 23' of the heel and toe control box 1 at the other end of the car. Similarly, each of the magnet valves 44 are controlled with reference to the heel control terminal 25 by means of switches 63, so that in accordance with which door it is desired to have opened or closed, selectivity is effected, whereby if any one switch is closed and the remainder left open, the door controlled by that magnet valve will be opened automatically upon operation of the controller, as will be hereinafter apparent. The brake pressure supply line is illustrated at 70, and the fluid pressure supply line is illustrated at 71, leading to one valve and motor 43, 42. It will be understood, however, that the fluid pressure supply line, as is customary, will extend to all of the motors and valves.

With the foregoing brief description of the illustrations given, I will now describe the operation of the system. In the first place, the toe controlled terminals 22 and 23, which cooperate with contactor 19, control the car controller. The heel controlled contactor terminals 22 and 23 cooperating with the contactor 19 also control the car controller. The terminals 24 and 25 with their cooperating contactor 20 of both toe and heel control, control the door operation. In the diagram shown in Fig. 5 the emergency brake is on and the door is open because no pressure is exerted on either the toe or heel pedals, with the result that terminals 22 are separated from terminals 23, and terminals 24 are in contact with terminals 25. Thus it will readily be apparent on inspection of Fig. 2 that first the emergency brake is applied, due to the upward position of the heel and toe pedals maintained by springs 13, and in consequence the upward position of the arm 29 which controls the brake controller due to the action of the spring 33. At the same time with contacts 22 separated from contact 24, the circuit to the automatic car controller 60 is broken, and circuit is established from current source to toe controlled terminal 24, toe controlled contactor 20, toe controlled terminal 25, wire 65, heel controlled terminals and contactor, 24, 25, and 20, wire 64, switch 63, wire 80, magnet valve 44, to ground, whereby fluid pressure is admitted to piston 46, and the door opened. Inasmuch as the only switch closed is the one which controls the right hand forward door, this door is the only one that is open. If it is desired to close the door, it will be apparent all that is necessary to be done is to depress the heel pedal, which depresses the brake control arm 29 to its second position, where, however, the brakes are still normally applied. This, however, breaks the circuit connection of the toe controlled contactor and terminals 20, 24, 25, so that the current to the magnet valve 44 of the door motor is shut off. Although depressing the heel establishes circuit connection between heel controlled contactor and terminals 19, 22, 23, because the toe controlled contactor and terminals 19, 22, 23, have not been operated, the power is still cut off from the automatic car controller 60. If both the heel and toe are depressed the circuit control behind the terminals 24, 25, to the door engine control valve is broken, and the circuit controlled by contact terminals 22, 23, is closed, whereby current is supplied the automatic car controller so that power is on, and the brakes are released in the manner hereinbefore described in connection with Fig. 2. If the heel is raised but not the toe, the door is still maintained in a closed position, due to the toe maintaining open the circuit between the terminals 24 and 25 which it controls. However, the current to the car controller 60 is cut off and the brakes are still off, due to the fact that the toe lever is still depressed, with the result that the car is capable of motion due to momentum, or is able to coast with the doors closed and the brakes off.

Therefore it will be seen that I am able to obtain four separate and distinct positions from one foot, and by means of the construction described I obtain the following control results which are briefly summarized as follows:—

1. With the foot removed, the door is open, the brakes applied, and the power cut off.

2. With the heel depressed, but not the toe, the door is closed, but the brakes are still applied, and the power is still cut off.

3. With both the heel and toe depressed, the door is still closed, the brakes are off, and the power is on.

4. With the heel raised, but not the toe, the door is still closed, the brakes are still off, but the power is cut off, and the car is capable of coasting.

In normal stopping the toe is raised but not the heel, which, as above explained, shuts off the power and gives the normal application of the brakes. Thereafter, upon removing the heel, the door is opened, so that when the foot is fully taken off, the emergency brakes are applied, the power shut off, and the door opened.

The cover 2 employed on the foot controller, if desired, may be provided with a suitable lock illustrated at 81, for allowing same to be locked in its closed position. By a suitable design of the size of the cover, when the same is closed the toe pedal is slightly depressed, so that in that position the door is closed, the power cut off, and the brake valve in neutral position. By the provision of a plurality of switches 63, one for each door of the car, it is possible to operate more than one door, say for example, two doors immediately adjacent, or two or more doors at different points in the car. By closing the switch of each respective door, the coincident operation of which it is desired to have, it will readily be understood that any number of doors will be operated at the same time. It will be apparent, however, that no door can be opened unless one of the covers is raised but the foot is not in place on either the heel or toe lever. When the heel and toe control boxes are provided at each end of the car the door controlling circuit is fed from both control boxes as shown in Fig. 5, so that all doors that have their single pole switch in closed position would open when either foot control was fully released, and would close again as soon as either the heel or toe lever was depressed, and, obviously, those doors whose single pole switches were in open position would not open at all. Therefore, as above stated, by setting his single pole switch in some certain position the motorman can open whichever door or doors he desires when he takes his foot off of the levers, but all open doors will close when he depresses either the heel or toe lever. He can close one door before another if he desires by opening its single pole switch. He can open additional doors provided his foot is off its levers by closing their single pole switches. Thus it will be seen that complete automatic or selective control of all of the doors is obtained, and, further, that no matter how many doors are open, all will be closed whenever either his heel or toe is depressed. In Fig. 3 I show a single pole switch 63 of standard well known construction enclosed within a casing 90. The switch 63 comprises the blade 91 operated about its pivot 92 by a handle 93, and adapted, when closed, to establish circuit connection between posts or terminals 94 and 95. The cover 96 of the box 90 is formed so as to fit around the handle 93 in such manner that when the cover 96 is closed, it automatically breaks the circuit between posts 94 and 95. The box may be locked in its closed position, for example, by means of the key 97. It will be understood that this box includes all of the door switches therein so that when the cover is closed all of the door switches therein contained would be opened. This would insure proper circuit arrangement when the motorman leaves one end of the car to transfer his operation station to the other end thereof, and thus prevent any doors other than those controlled by the door switches at the end of the car at which he takes his station from being opened.

Means may also be provided to enable a door to be opened while the car is in motion, for example, while it is in the repair shop for test or experimentation. Many means may be provided to enable this, which means are normally out of the control of the motorman, for example, a yardman's control may be supplied in the form of two contacts 100 101, provided on the side of the car, one of which contacts is connected to a source of power, and the other to one or more of the magnet valves 44. The repair man would merely establish circuit connection between contacts 100 and 101 to effect operation of the motor controlled by magnet valve included in the circuit therewith.

It might also be necessary to provide means to enable the motorman to open the door, say, when the trolley pole is off, and he has no electric power to control the magnet valve to open the same by power. To accomplish this an emergency valve may be supplied that controls the air supply to the magnet valve of one of the door engine differential valves. When this emergency valve is in normal position it connects the magnet valve to the air supply and the door controls in the usual way, but when the emergency valve is moved to exhaust, it exhausts the air from the end of the differential valve and opens the door regardless of the position of the foot levers or wether the trolley is off or on. This emergency valve is illustrated at 110, Fig. 5, and is in the nature of a three-way cock commonly employed in pneumatic work, wherein one connection 111 connects to the air supply and another connection 112 connects to exhaust. When this emergency valve is in normal position, communication is established between air supply connection 111 and pipe line 71, but when this valve is turned pipe line 71 is open to exhaust through connection 112 in the usual well known three-way valve manner. The automatic operation of the door to open position in the event of the operation of the emergency valve will be readily apparent on reference to Fig. 4, when it is understood that the valve is maintained at the limit of its movement, i. e., the position shown in Fig. 4, by means of the constant source of supply of fluid pressure to the air-chest 43. The normal operation of the valve 43 is effected by exhausting the pressure from behind the cylinder of larger diameter by the operation of the valve 44, but this exhaust can be effected, also by the withdrawal of fluid pressure in the pipe line 54, which in this case is used instead of pipe 53, so that the motorman is thus afforded means for opening the door in the event all power is turned off.

Many modifications and changes in details will readily occur to those skilled in the art without departing from the spirit and scope of my invention as defined in the claims, and likewise many applications of the invention herein contemplated may be made, for example, the invention is also applicable to the control of motor buses. When used in this way a somewhat different detail of design is preferable. Generally in motor buses, there is only one door to control, and in consequence the individual door control switch can be omitted, and the door controlled directly by a valve in the control box. As motor buses are always controlled from the same end, the cover of the control box is unnecessary, also, it appears preferable to dispense with the electric control and use fluid pressure or mechanical control for all functions. In Figs. 6 to 10 I have shown one type of modified design which may be employed in connection with motor buses. In this arrangement the heel and toe control box is likewise illustrated by reference character 1, and contains the transverse shaft 5, on which is mounted the two sleeves 6 and 7, controlled by the heel and toe pedals 9 and 11 respectively. In this arrangement I employ 5 downwardly projecting levers, three on the heel sleeve 7, and two on the toe sleeve 6. One lever 200 of the toe sleeve and one lever 201 of the heel sleeve are positioned between arms 203 and 204 of a pair of oppositely placed bell crank levers which are pivotally mounted as at 205 upon a suitable support, for example, 206, positioned in the box 1. One lever 207 on each of the sleeves 6 and 7, is utilized to form a seat for the springs 13, which normally tend to maintain the heel and toe pedals in their extended position. The last lever 208 operates against arm 209 of a bell crank lever which is likewise pivotally mounted as at 205, see Fig. 7. Arm 210 of bell crank 203 bears against a rounded head 211 carried at the end of a stem 212 of valve 213 operating in a valve chest 214.

A spring 215 interposed between the head 211 and the control box 1 normally tends to keep the valve in position to close the exhaust port 216. When the valve is in normal position it opens communication from pressure supply pipe line 217 to the respective lines 218 and 219. When the valve is depressed by means of the bell crank 203, 210, pipe lines 219 and 218 are opened to exhaust 216. Arm 220 of bell crank 209 operates a similar valve, supply connection being obtained through pipe line 217ª, the valve also controlling a pipe line 221. Pipe line 219 leads to a brake cylinder 222 of the usual construction containing therein the piston which is connected by a connecting rod 223 to the brakes. Pipe line 221 is connected to a pneumatic cylinder 224 containing therein the piston, the connecting rod of which bears against a clutch lever 225, normally retained in such position, for example, by means of the spring 226. The clutch is pivoted at 227, and is provided with a fork connection with the clutch 218 diagrammatically illustrated in Fig. 7. Pipe line 218 connects to the motor 229 which controls the door. As indicated, the door motor is of the differential cylinder type, the control connection being at the end of the cylinder of larger diameter, the cylinder of smaller diameter being in constant communication with the source of supply through pipe connection 230, whereby in the usual well known manner in the pneumatic motor art, by supplying pressure to or exhausting the same from the end of the cylinder of larger diameter the operation of the motor is effected. The motor is connected to the door, not shown, in the usual manner common to door operating engines. If desired, instead of having the one valve 213 control pipe lines 218 and 219, as illustrated in Fig. 7, separate valves 213 and 213ª controlled by bell crank levers 203, 210 may be employed.

The lever 204 controlled by arm 201 is connected by means of a rod 231 to one arm 232 of a bell crank lever pivotally supported within the box as at 233, the other arm 234 of which is pivotally connected to a rod 235, which rod is normally maintained in a raised position by means of a compression spring 216 secured at one end to the heel and toe control box 1 and at the other end to a collar 237 mounted on the rod. The rod 235 extends through the control box 1, and operates the gas accelerator, shutting down the gas when spring 236 is depressed, and turning on more gas when spring 236 is extended.

Figure 7:
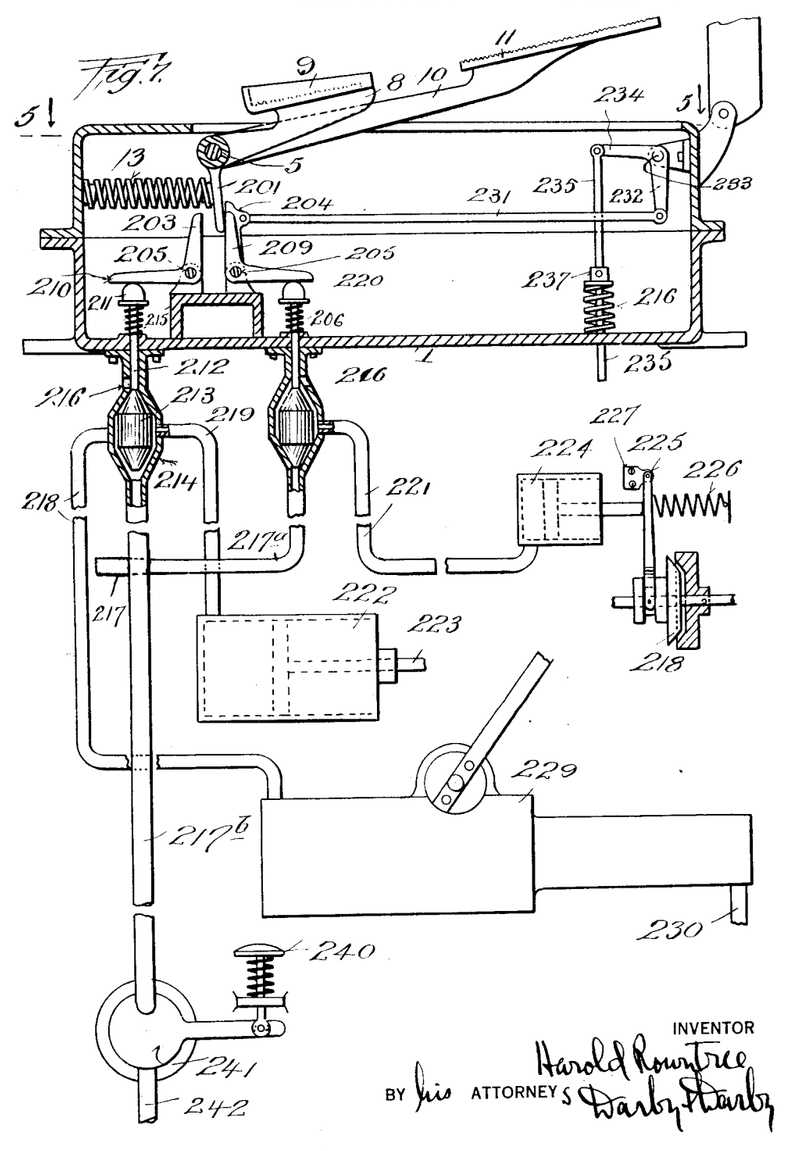
Fig. 7 is a sectional view taken on the line 7, 7, Fig. 6, and looking in the direction of the arrows, showing diagrammatically arranged relative thereto the parts controlled by the heel and toe control.

From the foregoing it will readily be seen that when the foot is removed from both the heel and toe levers the parts are in the position shown in Fig. 7, that is, bell crank 209, 220, is rocked to shut off communication between supply line 217ª and clutch 221, thereby, due to the pressure of spring 226 positioning the clutch, is in disengaging position. Arm 204 is rocked by the lever or finger 201 so as to depress the spring 236 shutting off the gas supply. Bell crank 203, 210, is rocked clockwise due to spring 215 so that fluid pressure is supplied from pipe line 217 to pipe lines 218, 219, thereby operating the door motor to open the door and applying the brakes. Therefore, when the foot is completely removed the door is open, the gas is shut down, the clutch out and the brakes applied. By a reversal of the position, i. e., both heel and toe depressed, the door is closed, the gas turned on, the clutch is in, and the brake is off. When the heel is up and the toe is down, the door is closed, the gas shut down, the clutch is out, and the brakes are off, so that the gearing can be changed. When the heel is down but the toe is raised, the door is closed, the gas shut down, the clutch still is in, and the brakes are off, and the bus is running slowly or slowing down due to the slowing down of the engine. By keeping the heel down and partially releasing the toe any desired regulation of the gas can be obtained.

Figure 8:
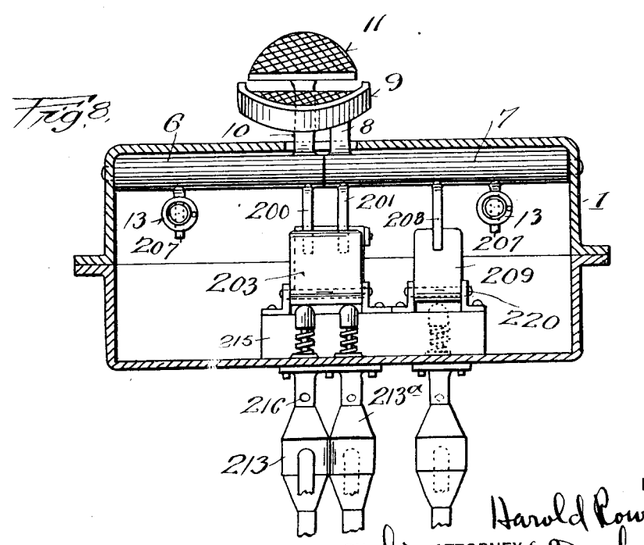
Fig. 8 is a sectional view taken on the line 8, 8, Fig. 6, and looking in the direction of the arrows.
Figure 9:
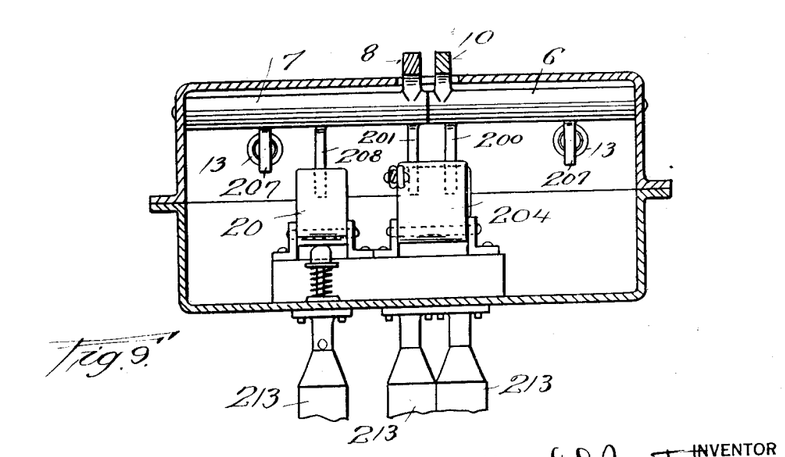
Fig. 9 is a sectional view taken on the line 9, 9, Fig. 6, looking in the direction of the arrows.
Figure 10:
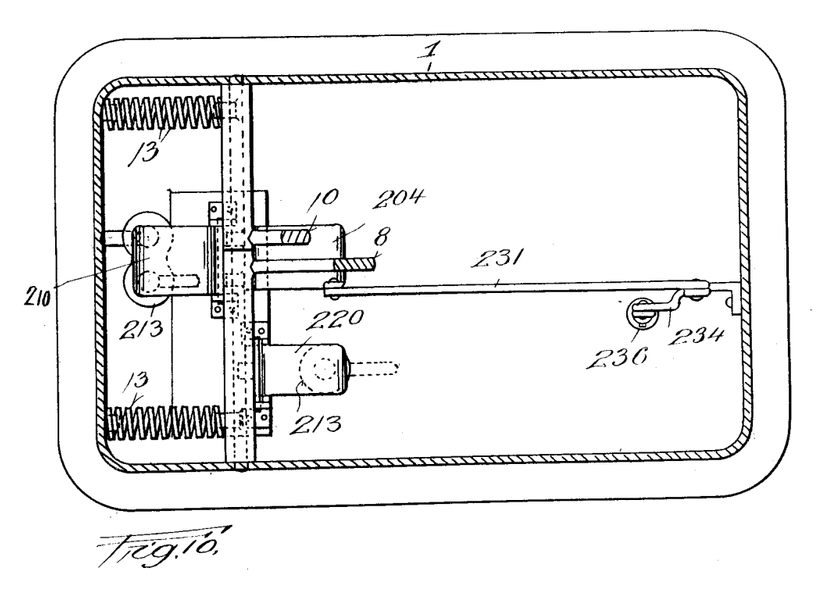
Fig. 10 is a sectional view of the structure shown in Fig. 6 with the cover of the control box removed.

I prefer the modified arrangement of Fig. 8 insofar as the number of valves 213 employed, i. e., the provision of an additional valve 213ª, as shown in Fig. 8, because it is sometimes preferable to adjust one to operate a fraction ahead of the other so that a partial depression of the toe or heel lever will close the door and yet not release the brakes, for example, to take care of a condition where the bus is on an incline or steep grade. From the foregoing it will be seen that I have supplied an exceedingly simple and highly efficient control for vehicles, which at all times provides for the safety of the passengers being conveyed thereby, but which confines all of the necessary vehicle and appurtenance control to one foot of the operator, leaving the hands free for such other duties or operations as may be required.

It may sometimes be desired to be able to fully apply the brakes without danger of opening the door. This, however, would be an abnormal condition, and should not, in my opinion, be a condition which would automatically happen, although it would require but slight modification to render the same automatic. To take care of this abnormal condition, however, I provide an additional foot button 240, see Fig. 7, which foot button would preferably be placed in the control box at the side of the heel and toe controls. This foot button is normally maintained by a spring at one limit of its movement and is pivotally connected to an arm of a valve 241, whereby, when the button is depressed, the valve is turned so as to connect fluid pressure from the source 242, pipe 217ᵇ, to the valve in the control box. It will be seen that the door will not open even after the foot is taken off of the heel and toe levers until the foot is placed on this extra button, but depressing either the heel or toe levers would close the door whether the extra button was depressed or not.

Having now set forth the objects and nature of my invention, and having shown and described a structure embodying the principles thereof, what I claim as new and useful and of my own invention and desire to secure by Letters Patent is,—

1. In a car control, heel and toe levers separately operable relative to each other, operating devices controlled thereby, and means controlled by the relative position of said heel and toe levers with respect to each other for selectively determining which of said devices are operated.

2. In a car control, the combination with independently depressible heel and toe levers, a propelling motor mechanism for the car, a control circuit therefor, and means for maintaining said circuit open until both of said levers are depressed.

3. In a car control, the combination with two separately operable control levers, of a brake control mechanism for the car, and means for maintaining said brake control mechanism in its "brake applied" position when neither of said levers are operated.

4. In a car control, the combination with independently depressible heel and toe levers, of a brake control mechanism for the car, and means for maintaining said brake control mechanism in its "brake applied" position when neither of said levers are depressed.

5. In a car control, the combination with two separately operable control levers, of a brake control mechanism for the car, means for maintaining said brake control mechanism in its "brake applied" position when neither of said levers are operated, and means for operating said brake control mechanism when either of said levers are operated.

6. In a car control, the combination with independently depressible heel and toe levers, of a brake control mechanism for the car, means for maintaining said brake control mechanism in its "brake applied" position when neither of said levers are depressed, and means for operating said brake control mechanism when either of said levers are operated.

7. In a car control, the combination with independently depressible heel and toe levers, of a brake control mechanism for the car, means for maintaining said brake control mechanism in its "brake applied" position when neither of said levers are depressed, and means for shifting said brake control mechanism to its "brake off" position when said toe lever is depressed.

8. In a car control, the combination with two separately operable control levers, of a door control motor for operating the door of the car, and means for maintaining said motor in its "door closed" position when either of said levers are operated.

9. In a car control, the combination with independently depressible heel and toe levers, of a door control motor for operating the door of the car, and means for maintaining said motor in its "door closed" position when either of said levers are operated.

10. In a car control, the combination with independently depressible heel and toe levers, of a door control motor for operating the door of the car, and means for maintaining said motor in its "door open" position when neither of said levers are depressed.

11. In a car control, the combination with independently depressible heel and toe levers, of a plurality of door control motors for operating the car doors, and means for controlling said motors by both of said levers.

12. In a car control, the combination with independently depressible heel and toe levers, of a door control motor for operating the door of the car, means for maintaining said motor in its "door open" position when neither of said levers are depressed, and emergency means for operating said motor independently of said levers.

13. In a car control, the combination with two separately operable control levers, of a plurality of door control motors for operating the car doors, means for controlling said motors by both of said levers, and emergency means for operating said motors independently of said levers.

14. In a car control, the combination with two separately operable control levers, of a door control motor for operating the door of the car, means for maintaining said motor in its "door closed" position when either of said levers are operated, and emergency means for operating said motor independently of said levers.

15. In a car control, the combination with two separately operable control levers, of a door control motor for operating the door of the car, means for maintaining said motor in its "door open" position when neither of said levers are operated, and emergency means for operating said motor independently of said levers.

16. In a car control, the combination with independently depressible heel and toe levers, of a door control motor for operating the door of the car, means for maintaining said motor in its "door closed" position when either of said levers are operated, and emergency means for operating said motor independently of said levers.

17. In a car control, the combination with two separately operable control levers, of a plurality of door control motors for operating the car doors, means for controlling said motors by both of said levers, and means for selectively limiting the control of said levers to one or more of said motors.

18. In a car control, the combination with independently depressible heel and toe levers, of a plurality of door control motors for operating the car doors, means for controlling said motors by both of said levers, and means for selectively limiting the control of said levers to one or more of said motors.

19. In a car control, the combination with two separately operable control levers, of a door motor for operating the door of the car, a circuit for controlling said motor, and means for maintaining said circuit closed when neither of said levers are operated.

20. In a car control, the combination with independently depressible heel and toe levers, of a door motor for operating the door of the car, a circuit for controlling said motor, and means for maintaining said circuit closed when neither of said levers are depressed.

21. In a car control, the combination with two separately operable control levers, of a plurality of door motors for operating the doors of the car, a circuit common to all of said motors to control the same, and means for controlling said circuit by both of said levers.

22. In a car control, the combination with two separately operable control levers, of a plurality of door motors for operating the doors of the car, a circuit common to all of said motors to control the same, means for controlling said circuit by both of said levers, and means for selectively limiting the control of said circuit to one or more motors.

23. In a car control, a depressible heel lever, two circuits controlled thereby, a propelling motor mechanism and a door motor respectively controlled by said circuits.

24. In a car control, a depressible toe lever, two circuits controlled thereby, a propelling motor mechanism and a door motor respectively controlled by said circuits.

25. In a car control, a depressible heel lever, two circuits controlled thereby, a propelling motor mechanism, and a door motor respectively controlled by said circuits, a depressible toe lever, and means for also controlling said circuits thereby.

26. In a car control, a depressible heel lever, two circuits controlled thereby, a propelling motor mechanism and a door motor respectively controlled by said circuits, a brake operating mechanism, and means for also controlling the same by said lever.

27. In a car control, a depressible toe lever, two circuits controlled thereby, a propelling motor mechanism and a door motor respectively controlled by said circuits, a brake operating mechanism, and means for also controlling the same by said lever.

28. In a car control, a depressible heel lever, two circuits controlled thereby, a propelling motor mechanism, and a door motor respectively controlled by said circuits, a depressible toe lever, means for also controlling said circuits thereby, a brake operating mechanism, and means for also controlling the same by both of said levers.

29. In a door control, the combination with a plurality of door control motors for operating the car doors, a common means for controlling said motors, and selective means for predetermining which of the motors will be actuated upon operation of said common means.

30. In a car control, a control box, a depressible lever supported therein, means for normally maintaining said lever at one limit of its movement, control mechanism actuated by the movement of said lever, a cover for said box, and means for moving said lever a predetermined distance when said cover is closed.

31. In a car control, a control box, heel and toe levers supported therein, means normally maintaining said levers at one limit of their movement, control mechanism controlled by said levers, a cover for said box, and means for moving one of said levers, a predetermined distance when said cover is closed.

32. In a car control, a control box, heel and toe levers supported therein, means normally maintaining said levers at one limit of their movement, control mechanism controlled by said levers, a cover for said box, and means for moving said toe lever a predetermined distance when said cover is closed.

33. In a car control, the combination with two separately operable control levers, of a plurality of door motors for operating the doors of the car, a circuit common to all of said motors to control the same, means for controlling said circuit by both of said levers, an auxiliary circuit for each of said motors and connected to said common circuit, and a switch controlling each of said auxiliary circuits.

34. In a car control, the combination with two separately operable control levers, of a plurality of door motors for operating the doors of the car, a circuit common to all of said motors to control the same, means for controlling said circuit by both of said levers, an auxiliary circuit for each of said motors and connected to said common circuit, a switch controlling each of said auxiliary circuits, a box enclosing each of said switches, a cover for said box, and means for automatically opening the switch when the cover is closed.

In testimony whereof I have hereunto set my hand on this 20th day of March A. D., 1922.

HAROLD ROWNTREE.